March 17, 1936. W. W. ROWE ET AL 2,034,421
APPARATUS FOR IMPARTING STRETCHABILITY TO WEBS
Filed July 15, 1932　　6 Sheets-Sheet 1

INVENTORS
William Wallace Rowe
Warren A. Morris
BY
Allen & Allen
ATTORNEYS March 17, 1936.  W. W. ROWE ET AL  2,034,421
APPARATUS FOR IMPARTING STRETCHABILITY TO WEBS
Filed July 15, 1932  6 Sheets-Sheet 4

March 17, 1936.  W. W. ROWE ET AL  2,034,421
APPARATUS FOR IMPARTING STRETCHABILITY TO WEBS
Filed July 15, 1932   6 Sheets-Sheet 5

INVENTORS
William Wallace Rowe
Warren A. Morris
BY Allen & Allen
ATTORNEYS

Patented Mar. 17, 1936

2,034,421

REISSUED

UNITED STATES PATENT OFFICE 2,034,421

APPARATUS FOR IMPARTING STRETCH-ABILITY TO WEBS

William Wallace Rowe, Cincinnati, and Warren A. Morris, Wyoming, Ohio, assignors to The Paper Service Company, Lockland, Ohio, a corporation of Ohio Application July 15, 1932, Serial No. 622,698

19 Claims. (Cl. 154—30)

Our process and apparatus relate to the production of corrugations or other configurations in paper or other webs, whereby the web is rendered stretchable transversely of the said configurations. While applicable to single pieces or sheets, our invention is of particular importance in the treatment of continuous webs. As such, it is directed to the continuous production of configurations longitudinally of the web. Hence it is one of our objects to provide a method and means for corrugating a web longitudinally so as to impart widthwise stretchability thereto.

Our invention is applicable either to plain webs, or to webs which have been creped prior to our treatment or will be creped thereafter, so that our invention provides a method and means for imparting the quality of multi-lateral stretchability to webs. Multi-lateral stretchability may also be produced in accordance with our invention by giving two treatments to the web, the second at an angle to the first.

It has hitherto been proposed to corrugate paper longitudinally by passing it between corrugated rolls, or by pulling it through a device comprising fluted plates. The difficulty presented by the first proposal is to be found in the fact that the formation of longitudinal corrugations implies a widthwise contraction, which the rolls do not properly permit. The second proposal faces the difficulty of pulling the paper through a forming device, with the attendant danger of breaking it. Moreover, the second proposal is not applicable to webs which have previously been given a longitudinal stretchability by being transversely creped or corrugated, since the pull on the paper will of necessity remove a great part, if not all of the stretch therein.

We shall describe our invention herein in connection with the treatment of a previously creped web of paper, since this presents the greatest number of problems, it being understood however, that this is not a limitation upon our invention.

Generically our invention contemplates forming means which travel with the sheet, the sheet being engaged, at the same time, by means, traveling with it or not as desired, which assist in forming it to desired configurations. Broadly stated, our invention comprises (1) means which, whether integral or discrete, present a series of rugosities or interspaced contacting elements for the sheet initially, (2) means for displacing the sheet between or with reference to the said rugosities, or interspaced contacting elements, and (3) means for maintaining the said displacement of portions of the web during the displacement of other portions, or means for preventing the loss of previously formed displacements during the augmentation of said displacements. This means may also comprise means for preventing the re-expansion of the sheet as by crushing or setting the corrugations, or the like. Means for performing the three functions hereinabove set forth are generic to our invention, although in some specific embodiments certain of the functions are performed, in part at least, by means in common.

Examples of the first means are, by way of illustration, a table-like member or plate of metal or other material, a belt, etc., the surface of which is provided with corrugations or rugosities extending in the general direction of sheet travel; a composite support or surface formed of discrete elements such as traveling belts, chain elements or the like; a grooved cylinder, etc.

The second means may vary with respect to the first. Examples of the second means not only include any mechanical or fluid agency for depressing the paper between the rugosities of the first means, but also mechanical means for gripping the web in conjunction with the first means, where the displacement is caused by a movement of the first and second means, or otherwise. The second means may, by way of illustration, comprise a series of interspaced belts, bands, rollers, or conveyor-like elements. In our invention either the first or the second means (and in our preferred types of organization, both) will move with the sheet or web being treated, whereby the strain on the web is diminished and certain other advantages attained which will hereinafter become apparent.

The third means may comprise a continuation of the first and second means, together with devices for holding them in inter-engagement or contact, or it may comprise separate members for the purpose.

Falling within this general concept of our invention there are certain specific modifications. It will be remembered that if a sheet or web is corrugated or given other configurations longitudinally, there will be a widthwise contraction therein. If deformations are attempted to be made entirely across the width of the sheet at one time by inter-digitating members difficulty will be had because the contraction is cumulative, because the edges must take up relatively more than the center portions, and because the sheet will not slip readily with respect to the mechanical agencies engaging it across its face, so as to accommodate the contraction aforesaid. In one aspect of our invention we avoid this difficulty by causing the second means hereinabove described to engage and depress the sheet with respect to the rugosities of the first means in a successive manner, usually but not necessarily, from the center outwardly. Thus where the first means comprises either a grooved plate or a series of belts providing a corrugating surface, and the second means comprises a series of belts, these latter belts may be caused to depress the web between the corrugations of the first means successively in the direction of travel of the web. To make this more specific, in one aspect of our invention we bring down a central belt first and cause it to make, in co-operation with the first mentioned means, a central groove or corrugation in the web, then at interspaced points in the travel of the web we successively bring down pairs of belts into forming position, one on either side of the center line of the sheet. This may be referred to as the successive interengagement of members.

In a second modification of our invention we cause the members inter-engaging the sheet to converge progressively and/or successively in the direction of travel of the sheet or web so that the web is contracted widthwise by the convergence of these members. Where the members merely grip the sheet at interspaced points or lines and then converge as aforesaid, the slack in the sheet forms itself into corrugations, or other configurations between the interspaced members. Where the members come into inter-digitating relationship they may be caused to do this simultaneously across the width of the sheet, but progressively in the direction of its travel so that the convergence aforesaid provides sufficient slack for the complete interengagement of the members without rupturing the sheet. Both species provide means of obtaining cumulative contraction widthwise, in that the edge portions of the sheet are contracted cumulatively more than the portions near the center.

Modifications may be made in these species, and of course they may be combined as by first corrugating the sheet by the successive interengagement of forming members and then making the corrugations deeper by causing the members still traveling with the sheet to converge in the direction of travel. Still other modifications may have progressive convergence combined with progressive interengagement.

As will be pointed out hereinafter, it is necessary when corrugating highly flexible webs, such as paper or the like, to provide means for maintaining corrugations already formed therein while forming additional ones, or while modifying the shape of the corrugations.

Finally it will usually be the practice to crush or otherwise set the corrugations as by drying, cooling, cementing, or the like. This may be done after the complete formation thereof, or the corrugations may be crushed as they are formed.

The objects of our invention which will be apparent from the foregoing or will be clear to those skilled in the art upon reading these specifications, we accomplish by that process and mechanism of which we shall now describe certain exemplary embodiments, reference being had to the drawings which form a part hereof.

In the drawings:

Fig. 9 is a plan view, and Fig. 10 an elevation of a type of device employing successive interengagement in connection with a plate as the first mentioned means.

Fig. 11 is a sectional view taken along the lines 11, 11 in Fig. 10.

The figures are semi-diagrammatic in their nature and it will be understood that modifications may be made in the specific mechanism employed without departing from the spirit of our invention.

In Figs. 1 to 4, inclusive, there is illustrated a type of machine in which there are members which come into interengagement and also converge as they travel with the sheet. We have shown a lower series of belts 1 and an upper series 2. The lower series passes over interspaced rolls or sheaves 5 and 6, which will preferably be driven, and which are grooved to receive the belts. The upper series passes over interspaced rolls or sheaves 7 and 9 which will likewise be grooved, and may be driven. It will be noticed that the belts and hence the grooves are further apart on rolls 7 and 5 than on 6 and 9. The belts therefore converge in the direction of travel as they engage the sheet 10, and diverge again as they return over the rolls, out of contact with the web. Should there be any difficulty in maintaining the direction of travel of the belts, suitable guiding means, such as those hereinafter described in connection with Fig. 13, may be provided; also rolls 13-17 inclusive, may be grooved to hold the wires in their converging path of travel.

The belts may be of any character desired. We have had excellent results with a type of belt which is a coiled spring of steel wire or the like, and which is illustrated at 12 in Fig. 24. While the series of belts should present interspaced forming elements, yet they need not be discrete members. The belts may be interconnected mechanically if desired, or may be parts of one traveling member, such as a belt of rubber or the like, in which the progressive convergence and divergence are taken care of by contraction or expansion of the rubber between the forming elements.

In the embodiment of Figs. 1 to 4, the series of belts 1 and 2 may be regarded indiscriminately as the first or second means hereinabove referred to, it being understood that the functions of both are present.

The rolls 5 and 7 are further apart than the rolls 6 and 9, and it is our object to produce a progressive interengagement of the belts as they converge, which interengagement is, however, simultaneous across the width of the sheet. Devices are provided to bring the belts into interengagement and to hold them there. As an exemplary showing, we have disclosed a series of rolls 13, 14, 15, 16 etc. which may be staggered on either side of the belts. These rolls may be spring mounted, and may be so adjusted as to make the interengagement of the belts proportionate to the convergence thereof. They may also be employed in opposed pairs, or other holding and controlling means may be substituted for the rolls, as bars, plates, conveyor elements, etc.

Figure 1:
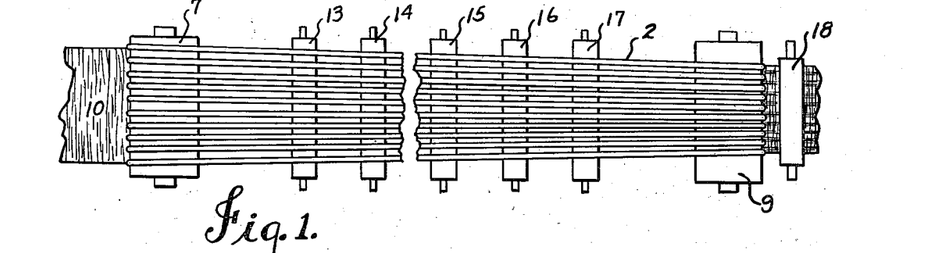
Figure 1 is a plan view, and Fig. 2 an elevation of a mechanism in which the members engaging the sheet are caused to converge progressively in the direction of the travel of the sheet.
Figure 2:
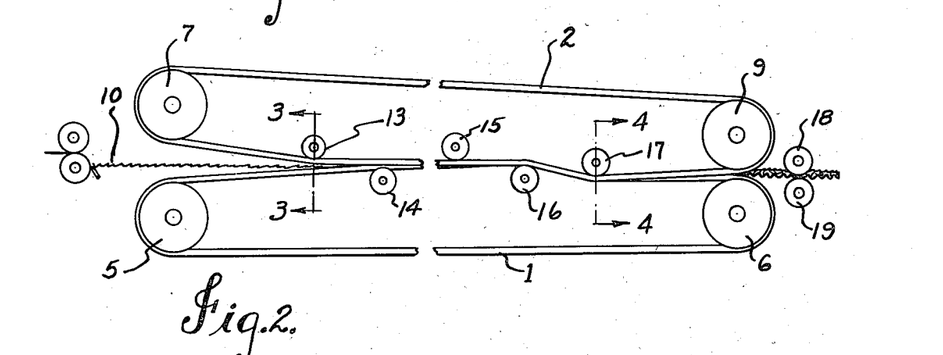
Figure 3:
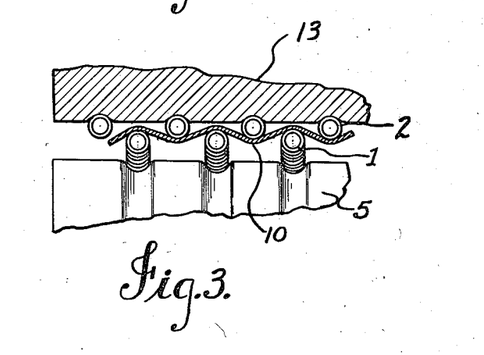
Figs. 3 and 4 are respectively partial sectional views taken along the lines 3, 3 and 4, 4 of Fig. 2.
Figure 4:
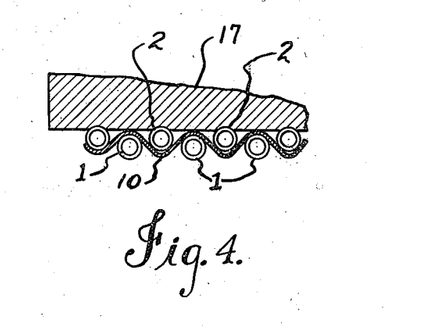

Fig. 3 shows the traveling elements as they begin to interengage; Fig. 4 shows how, after complete interengagement slack may be formed widthwise of the web by a further convergence of the belts.

It will be obvious that with a modification of the devices 13 to 17, inclusive, other means may be substituted for the lower or upper series of belts 1 or 2, such as a smooth, straight or curved plate having converging grooves cut therein. So long as there is one series of forming elements such as the belts 2, moving with the web so as to propel it, the other means employed need not necessarily move providing there is no great frictional engagement between the web and means not traveling therewith. We prefer of course, to have both sets of means traveling with the web, since under these circumstances the web is subject to substantially no strains longitudinally, whereas the widthwise strains are taken care of by means hereinabove described. It is readily possible in our process and mechanism to corrugate relatively heavy webs, boxboards, strawboard and the like, which may or may not have been softened by a water treatment, or webs which have previously been creped and have a longitudinal stretchability which it is desired to retain. When the corrugations or other configurations have been completely formed, it is desirable to set them in the paper by crushing or otherwise, and in Figs. 1 and 2 we have shown a pair of crushing rolls 18 and 19 located so as to engage the sheet just after it leaves the corrugating devices. This type of crushing mechanism is not necessary however, and in some installations we have secured excellent results by running the paper between a revolving drum and a web of felt, or the like, tightly stretched thereon. The felt web seems to be beneficial in preventing the widthwise and lengthwise re-expansion of the web until the crushing action is completed. Pressure rolls may be used in connection with the felt web.

Crushing greatly reduces the stiffness of rounded corrugations, softening the sheet in every direction. It retains the stretchability by preventing loss of corrugations in handling, winding into rolls, stacking, baling, etc. It reduces the thickness of the sheet, thereby making it more difficult to pull the stretchability out. If the stretchability is to be removed from a sheet having crushed corrugations, the web has to increase in thickness, or else the pleats have to roll or peel. This action is further resisted where the web is confined under pressure, as when it forms the liner between the contents and the outer wall of a burlap bag or the like. Such pressure would tend to flatten out uncrushed corrugations; but it will tend to hold crushed corrugations. Similar actions occur when sheets are stacked, stored or baled.

Figures 5, 6:
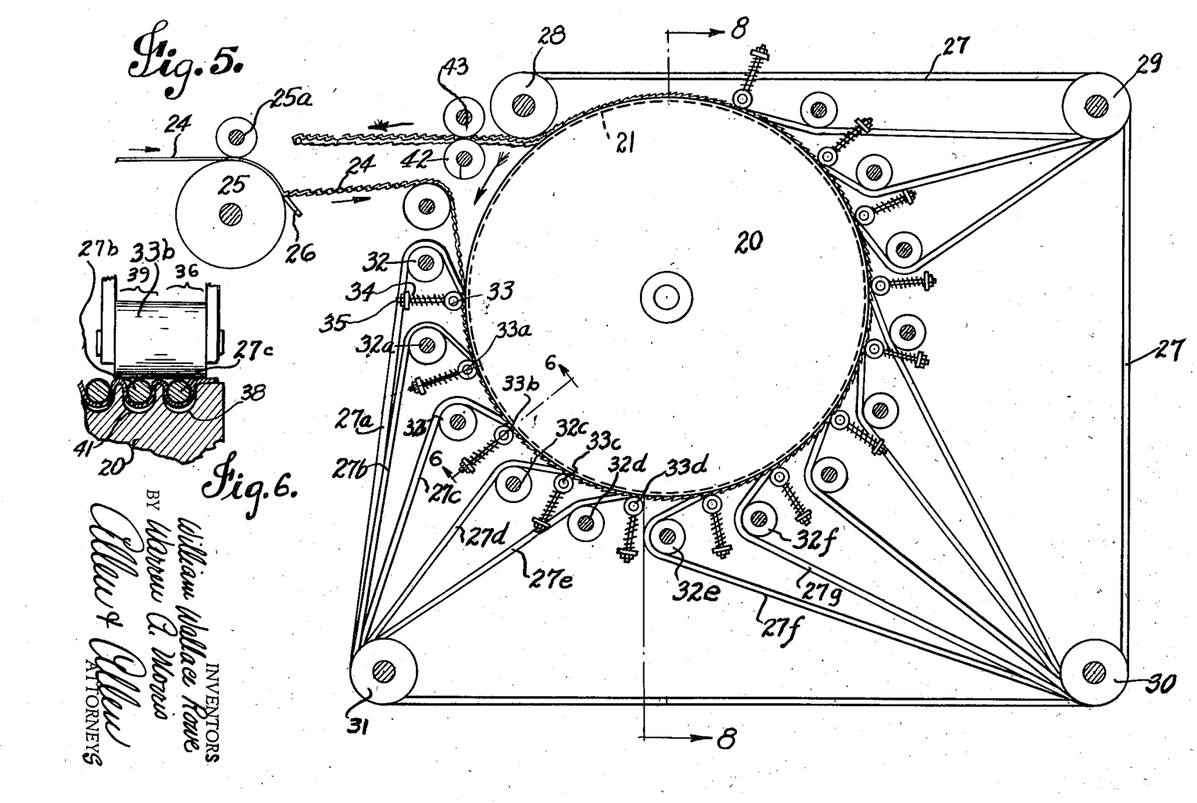
Fig. 5 is an elevational view of a device employing successive interengagement, the first means hereinabove mentioned being a grooved cylinder.
Fig. 6 is a view of a device for causing and maintaining the interengagement of members in the first and second means.

In Fig. 5 we have illustrated a type of mechanism embodying the feature of a successive interengagement of forming members as distinguished from a convergence thereof during the course of travel. The first of the essential means hereinabove referred to is in this case a cylinder 20, which is provided with parallel grooves 21 about its periphery. A web of paper, or the like, 24, which may previously have been creped by means of the cylinder 25, the back-up roll 25a, and the doctor 26, is led to the surface of the cylinder 20 and about the surface thereof, through as large an arc as is practical. In the course of travel of the web portions of it are successively displaced into the grooves of the cylinder by means of belts, wires, or other forming elements as shown. All of these wires indicated generally at 27 pass over a common return sheave or roll 28. The central wire indicated at 27a passes over sheaves 28, 29, 30 and 31, the purpose of which are to carry the belts about the cylinder, but away from the periphery thereof in the path of return travel of the belts. The belts in their forward travel of course, pass about the surface of the cylinder and enter the grooves in a successive fashion. The first belt 27a passes over sheave 32, which causes it to be led onto the surface of the cylinder 20 in a substantially tangential direction. A pressure roller or sheave 33 presses the belt 27a down into the central groove of the cylinder 20, deforming the paper and producing a corrugation therein. The next pair of belts 27b, one on either side of the belt 27a, are led over a pair of sheaves 32a so as to approach the surface of the cylinder 20 tangentially, but at a point removed in the path of travel of the cylinder from the point of engagement of the belt 27a therewith. Similarly a pressure roll 33a is provided to press the belts 27b into the grooves of the cylinder adjacent the groove into which the first belt was depressed. Likewise belts 27c, 27d, etc. pass over respective pairs of sheaves 32b, 32c, etc. to cause them to approach the surface of the cylinder tangentially at interspaced points. Successive pairs of belts thus approach the surface of the cylinder at interspaced points about the periphery thereof, and are caused to enter the grooves by the pressure rollers 33, 33a, 33b, etc. Some of the belts, since their path of travel does not comprise a great part of the surface of the cylinder 20, may be returned over sheaves 29 or 30, instead of 31 (or any other sheaves interspaced about the periphery of the cylinder, as will be well understood).

The pressure devices 33, 33a, etc. may be held by springs 34 and may also be provided with stop means 35 so that while they approach the surface of the cylinder closely enough to depress the belts into the grooves thereof, they cannot approach so closely as to pinch the paper against the surface of the cylinder.

As shown in Fig. 6, our pressure devices 33b may have a portion indicated at 36, the purpose of which is to depress the approaching belt 27c into the groove 38 of the cylinder 20. It likewise has a portion 39, the purpose of which is to hold in position the belt 27b, which has previously been depressed into the groove 41 by a preceding pressure device. This is a necessary precaution because if the belt 27c is depressed into the groove 38 without holding means for the belt 27b, the paper will pull up out of the groove 41, pulling the belt 27b part way with it, hence the desired widthwise contraction of the paper will not be secured, unless belts were put under strong enough tension, which is possible but undesirable. Instead of separate pressure rollers 33 etc., rollers may be employed in which the holding portions are broad enough to hold into their respective grooves all of the belts theretofore depressed. Under some circumstances the pressure rollers may be slightly grooved and the guiding sheaves 32, etc. eliminated.

As the paper leaves the surface of the cylinder 20, the corrugations therein may be crushed by a pair of rolls 42, 43, or otherwise as desired.

Figure 7:
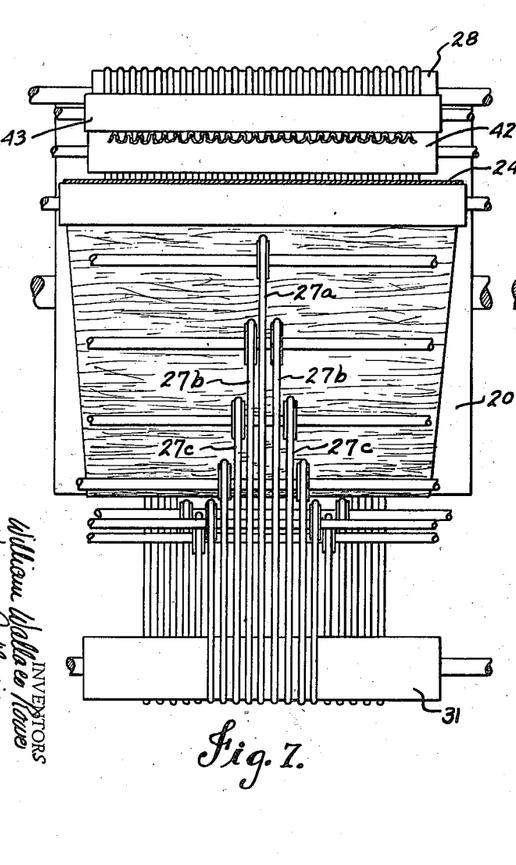
Fig. 7 is a front elevation of the device of Fig. 5.
Figure 8:
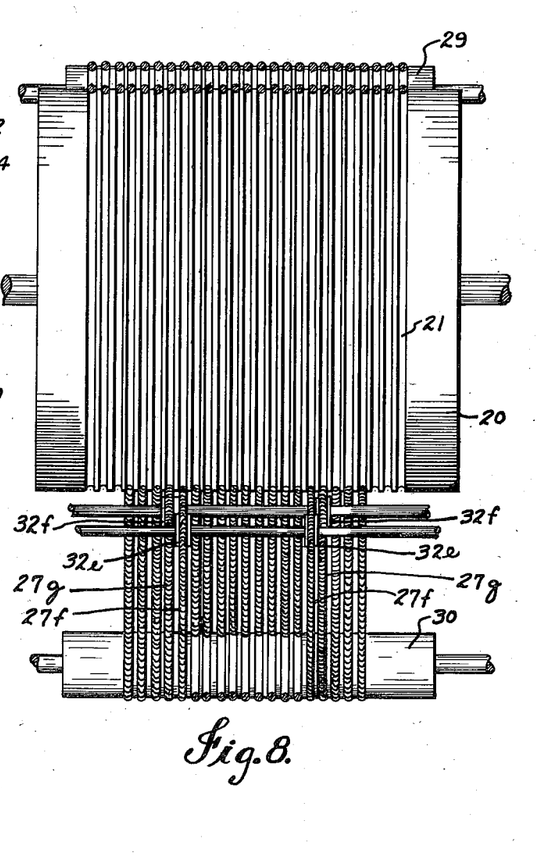
Fig. 8 is a semi-sectional view of the device of Fig. 5, taken along the lines 8, 8.

The nature of the action of the various devices is illustrated in Figs. 7 and 8, where, however, the pressure rolls have been omitted. It will be seen that the corrugation produced by the belt 27a is completely formed while the web has its outer portions entirely free, but before the belts 27b engage it. Likewise the corrugations produced by the belts 27b are completed while the edges of the paper are free to pull inwardly and before the belts 27c contact it. In this manner pairs of corrugations are successively formed in the web while the web is free to draw in to accommodate the necessary widthwise contraction. It will also be apparent that should a cylinder 20 be chosen of insufficient diameter to permit the corrugating of as wide a web as desired, two or more of the cylinders, with co-operating mechanism, may be employed in tandem.

It will be observed, particularly in Fig. 6, that the grooves in our cylinder 20 are wider than the ridges which divide them. This makes for a greater degree of stretchability in the finished web. If regular sinusoidal corrugations are formed there is a limitation upon the amount of stretchability which may be put into the web, because to deepen the corrugations implies a concomitant widening. In order to increase the stretchability we increase the depth of one set without increasing the width of the other or increase the depth of both sets without increasing the width of either. This may easily be done with a grooved cylinder or plate by making the ridges narrower than the grooves. Stretchability may still further be increased by deepening the grooves without widening them and providing pressure means of a type which will enter the deep grooves and depress the belts or wires toward the bottoms thereof.

In this embodiment of our invention the cylinder 20 is driven and likewise the various belts are preferably driven, which may be accomplished by means of power applied to the rolls 28 to 31, inclusive, or any of them. It will be apparent that modifications may be made in this device while utilizing the particular mode of operation which it exemplifies. Thus for the cylinder 20 a member presenting a corrugated surface extending horizontally could be employed, and this member could be a moving member traveling with the sheet or not, as desired. A device somewhat like a chain conveyor having a series of matching plates might be provided and the plates so grooved and so supported from beneath during the course of a horizontal travel as to provide a moving surface with appropriate configurations. Again stationary means might be employed, the belts moving with the sheet being relied upon to carry the sheet. Instead of a plate, the supporting means might consist of another series of belts such as the series of belts 1 in Fig. 1. Certain of these modifications will now be described in exemplary form.

Figures 9, 10, 11:
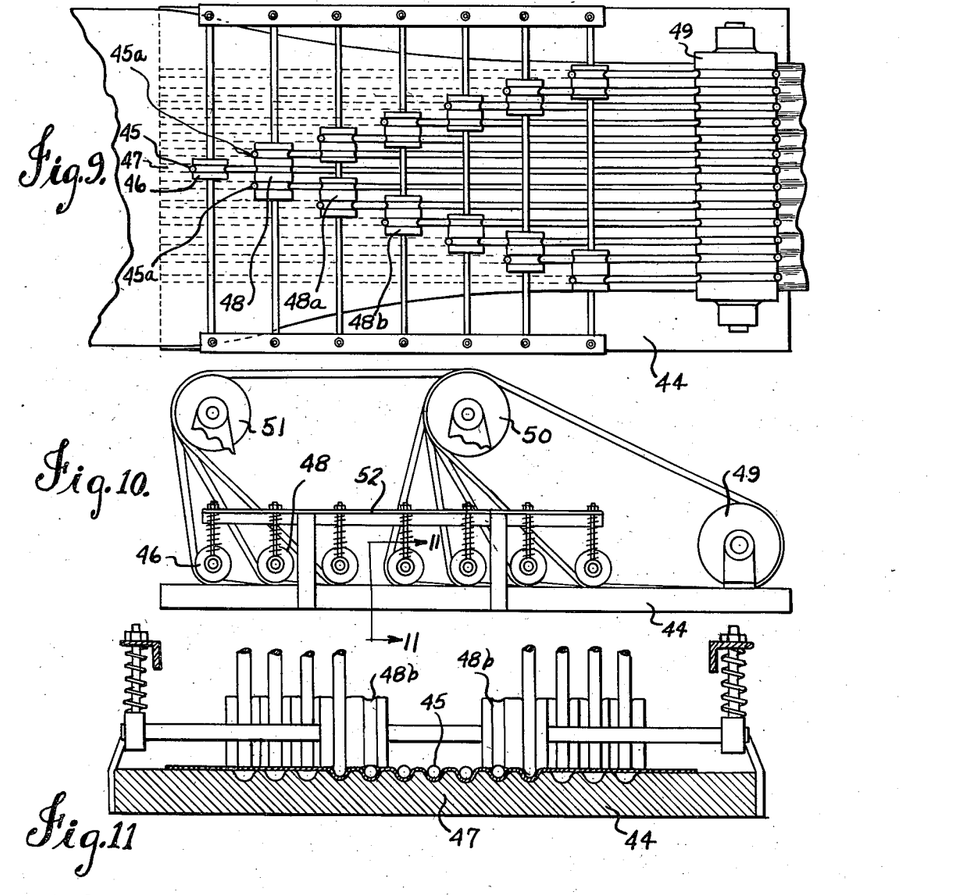

Figs. 9, 10 and 11 show a device in which there is a base plate 44, the surface of which is machined to present a series of longitudinal grooves. Paper passes over this plate and is caused to assume a corrugated form by means acting to depress portions of it into the grooves aforesaid in a successive manner to allow for the widthwise contraction of the material. A number of mechanical means for performing this function may be employed, providing they travel with the sheet in the sense at least of propelling the sheet over the surface of the plate, and providing also that means are present to hold the corrugations already formed while additional corrugations are being formed. Of the several mechanical means which may be employed, we prefer in this embodiment also to employ traveling belts since they may be caused to exert a continuous forming action on the sheet. We have shown a belt 45 passing over a sheave 46 by means of which it is depressed into a central groove 47 in the plate 44. At an interspaced point in the travel of the web 2, additional belts 45a may be brought down over a sheave 48, the central portion of which is shaped to hold the belt 45 in its groove. It will be clear that if the depressing means are themselves grooved, they will not depress the belts as far into the grooves of the plate. Under many circumstances grooves in the depressing means may be eliminated, especially where grooved guiding rolls (not shown) are also employed. Similarly other belts may be brought down in pairs to produce other corrugations in a successive manner. We have shown all of the belts passing over an end sheave or roll 49 and a supporting roll 50. Some of the belts additionally pass over another supporting roll 51. There may, of course, be as many of these rolls as desired. We have shown pressure rollers 46 and 48 as controlled by springs from a support 52, and as the means whereby the belts are brought down to the plate and depressed into the grooves thereof. If it is desired to relieve the elements 46, 48, etc., of tension, additional sheaves may be employed corresponding to the sheaves 32, 32a, etc., of Fig. 5. Fig. 11 clearly illustrates the way in which the corrugations already formed are held while additional corrugations are being formed.

In the employment of grooved plates, it is possible to make these plates curved convexly so that the tension of the belts may be more effectively exerted thereupon. It is also possible to employ a plate, preferably curved, having converging corrugations or grooves therein, which become progressively deeper in the direction of travel of the sheet. In this way slack formed by progressive convergence of the grooves is directly formed into deeper corrugations.

Figure 12:
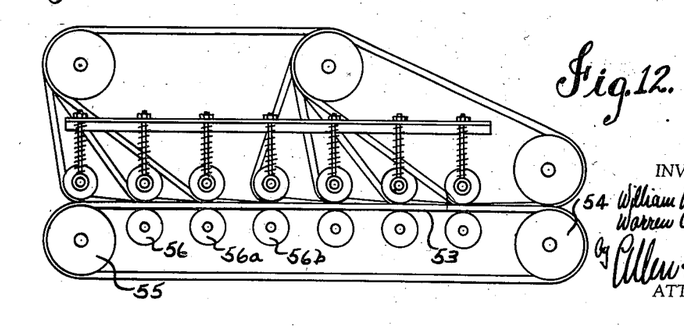
Fig. 12 is a type of device employing successive interengagement where the means first mentioned hereinabove is a series of belts.

Fig. 12 shows a type of device in which the plate 44 is replaced by a series of belts 53 passing over rolls or sheaves 54 and 55 and supported beneath the pressure rollers, as hereinabove described, by backing up rolls 56, 56a, etc.

Figures 21, 22, 24:
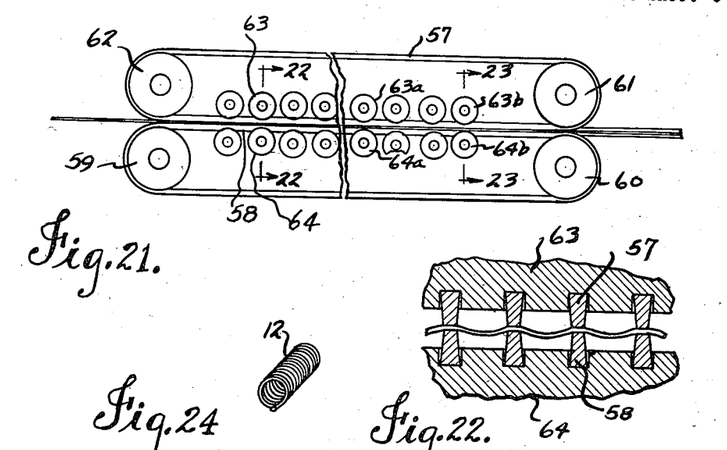
Fig. 21 illustrates in elevation a device employing gripping members which converge in the direction of their travel.
Figs. 22 and 23 are respectively sectional views taken along the lines 22, 22 and 23, 23 of Fig. 21.
Fig. 24 shows a type of belt or forming device which we have found advantageous.
Figures 23, 25:
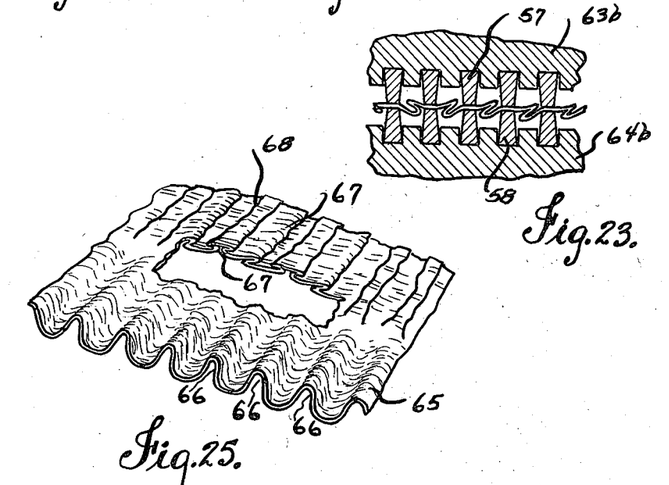
Fig. 25 shows a piece of our product before and after the crushing operation.

Still another modification is shown in Figs. 21 to 23, where we have provided a series of interspaced gripping elements which contact the sheet and afterward are brought together widthwise so as to cause the sheet to be deflected or deformed therebetween. We have shown an upper series of belts 57 and a lower series of belts 58 passing respectively over end sheaves 59, 60, 61 and 62. Opposed pairs of rollers 63, 64, etc. are shown. All of the sheaves or rollers are grooved to hold the belts 57, 58 in proper spaced relationship throughout the machine, and it will be understood that these belts converge in the direction of their travel as they engage the sheet. In this embodiment of our device it is necessary to use a type of belt which may be caused to grip the sheet quite positively, and for this reason we prefer to employ belts which, like rubber belts, may be caused to have a flat gripping surface and an enlarged base, whereby they may be accurately guided.

We may also employ a smooth supporting surface, such as may be provided by a plate or cylinder, together with gripping elements contacting the web from the other side, and moving in converging paths.

Instead of the opposed pairs of rollers 63, 64, etc., other means for supporting the belts 57, 58 and guiding them in converging paths may be employed. Thus opposed plates having converging grooves in them may be provided, and the belts caused to travel in the grooves. In this instance anti-friction means may be provided in the grooves or upon the belts. Again the belts may be made a part of or mounted upon conveyors of chain or other suitable form, suitably mounted to ride upon rails or the like, and having guiding means to cause the belts to converge. The convergence of the belts or other gripping means need not be concurrent, but may be successive, from the sides of the web inwardly toward the center.

As the sheet enters the device of Fig. 21, it is gripped at interspaced points between the belts 57 and 58. As these belts converge they force a widthwise contraction of the sheet. The sheet is shown partially contracted in Fig. 22, which is a section taken along the lines 22, 22 of Fig. 21. In Fig. 23 the belts are shown converged and the paper displaced between them into irregular configurations. These configurations will, of course, not be as symmetrical as they would if positively guided by the supporting devices, say, of Fig. 9; but this in general makes no difference because the object is to produce in the sheet a widthwise stretchability, and when the corrugations are crushed or otherwise set it makes no substantial difference whether the pleats are exactly symmetrical or not.

In Fig. 25 we have made a composite showing of one form of our product before and after the crushing treatment. This may be thought of as a sheet or web which has previously been creped in the usual manner, and which therefore has a series of transversely extending creping crinkles 65, giving it lengthwise stretchability. It also has a plurality of lengthwise corrugations 66. After crushing as shown in the upper part of the figure, it has a plurality of pleated formations 67, characterized by fold lines 68. The product can be made with as much stretchability as desired within reasonable limits in the transverse direction, and more particularly it is possible to equal in the transverse stretchability produced by our process the usual amounts of lengthwise stretchability imparted by creping processes. We thus secure a product which is perfectly stretchable in all directions.

Our product may be varied when made of creped paper by what might be termed a herringbone effect. Where, after contraction of the sheet by converging members, there is considerable looseness of the web between the forming members as is shown in Figs. 4 and 23, it is possible to flatten out the corrugations in part while retaining widthwise stretchability by driving some members contacting the sheet faster than others. This may be done in the device of Fig. 4 by driving the wires 1 faster than the wires 2; and in the organization of Fig. 23 by driving alternate pairs of the belts 57, 58 at different speeds, in which instance separate supporting sheaves for the belts in each group will be required.

Figure 13:
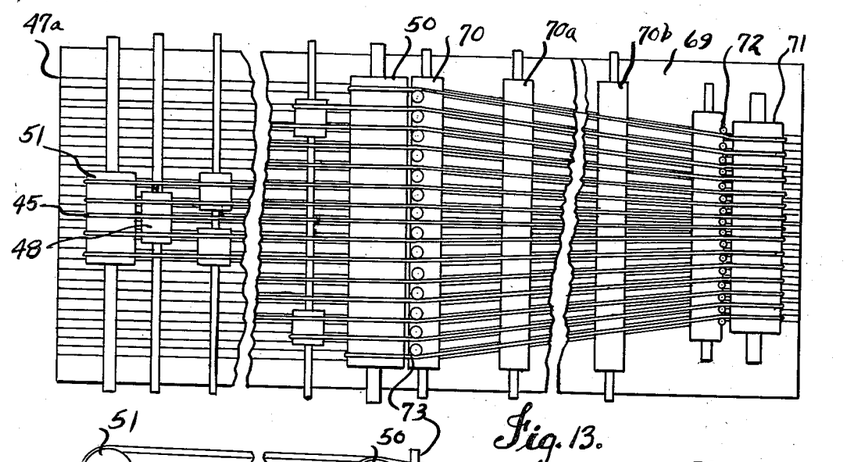
Fig. 13 illustrates in plan and Fig. 14 in elevation a device employing both successive interengagement and converging of the members in the direction of travel thereof.
Figure 14:
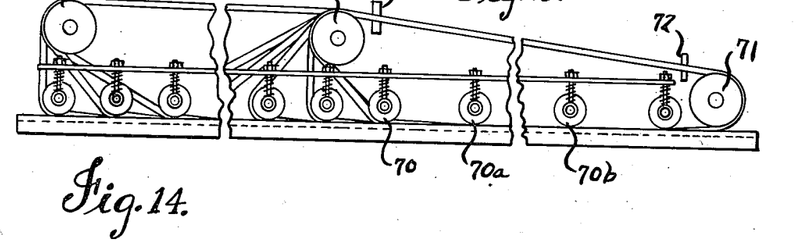
Figure 15:
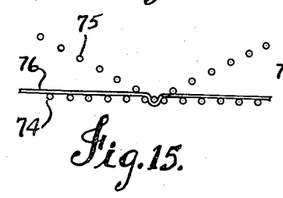
Figs. 15-20, inclusive, are semi-diagrammatic illustrations of the deformation of a web by successive interengagement of the forming means. The conditions illustrated by these figures are produced in the machines of Figs. 5, 9, 10, 12, 13 and 14.
Figure 16:
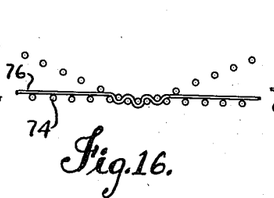
Figure 17:
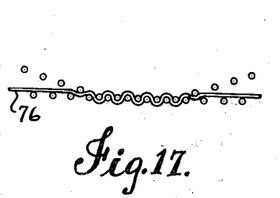
Figure 18:
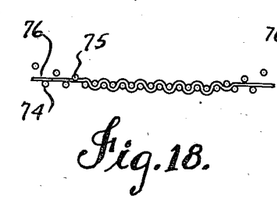
Figure 19:
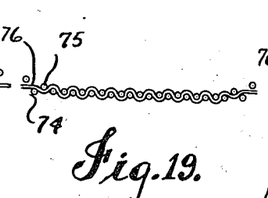
Figure 20:
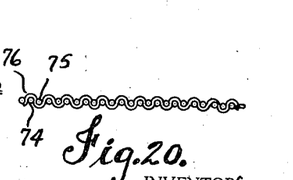

Particularly where slack portions are desirable in the sheet, it will be clear that combinations of our mechanisms may be desirable. Thus the initial corrugations may be produced in the web by a suitable mechanism, in which successive interengagement of the members is carried on, and afterwards the depth of the corrugations may be increased or slackness produced in the sheet by members engaging it which contract during the course of their travel with the sheet. In Figs. 13 and 14 we have shown a plate 69 having a series of grooves 41a in the face thereof, which are parallel throughout a part of their length, but converging throughout another part. In the parallel portion we may provide a mechanism like that in Fig. 10, wherein belts 45, etc. are successively brought down by pressure devices and into interengagement with the grooves. We may also provide pressure rollers 70, 70a, etc., to hold the wires in the grooves during the convergence thereof, returning the wires over an end sheave 71 in which the grooves are closer together than in the sheaves 50 or 51. In order to provide a positive guide for the wires between the sheaves, we may provide deflecting rollers or guides 72 and 73 as shown, for changing the direction of wire travel during the return thereof.

We have illustrated in Figs. 15 to 20 diagrammatically the principle of successive deformation of the sheet. Although the lower forming elements have been indicated at 74, etc. as wires (presupposing an apparatus something like that in Fig. 12) it will be understood that other devices may be substituted for these wires. The upper wires are indicated at 75, and the way in which the sheet 76 is deformed by the successive interengagement of the wires or other forming members will be apparent.

It will be understood that modifications may be made in the mechanical agencies employed. By way of example but without limitation, where supporting means traveling with the sheet and presenting to it a series of interspaced corrugations are provided, the depressing means may be a tapered blast of air, the purpose of which will be to produce the effect diagrammatically illustrated in Figs. 15–20, inclusive. Throughout all of these modifications however, our invention is characterized by means traveling with the sheet or web, and likewise by means having the three main functions hereinabove first discussed, although these functions may be divided differently between different elements as between modifications.

Webs of paper or the like, particularly if in softened condition, are not well adapted to hold shapes imparted to them. This explains the necessity of providing holding or maintaining means in connection with or as a part of supporting means and deforming means. In working with webs which must not be greatly tensioned, it is, as hereinabove explained, preferable to have at least one set of members, having one or more of the primary functions, traveling with the web. Ideal conditions are perhaps best obtained in the practice of our invention by providing supporting and deflecting means upon either side of the sheet which are both continuous and travel with the web, and by providing means for causing such a continuous interaction of such means as will retain corrugations previously produced. But excellent results may in many cases be secured by the use of means, some of which are not continuous, and some of which may not move with the web. Crushing means may be caused to act successively on the web as corrugations are formed therein.

Having thus described our invention, what we claim as new and desire to secure by Letters Patent, is:

1. In corrugating apparatus means presenting a corrugated surface adapted to move substantially in the same plane as a web, the corrugations in said surface being substantially disposed in the direction of travel of said web, means moving with the web acting to depress said web into the interstices of said surface, whereby portions of the said web are contracted widthwise more than other portions, and means adapted to hold each corrugation continuously from the point of formation at least until the formation of the next succeeding corrugation.

2. In corrugating apparatus, corrugating means providing a series of longitudinal ridges continuously traveling with a web and successively acting means for depressing the web between said ridges, said means adapted to hold each corrugation continuously from the point of formation at least until the formation of the next succeeding corrugation.

3. In a corrugating apparatus, means for presenting to a web a series of interspaced forming elements, and means moving with said web for deforming portions of said web with respect to portions supported by said elements, and means for maintaining a deformed condition of portions of said web, said means acting on said deforming means.

4. In corrugating apparatus, corrugating means traveling with a web, said means adapted to present to said web, continuously, a surface having ridges, and means for depressing said web into said ridges, said means arranged to act successively in the direction of travel of said web, and means for continuously maintaining corrugations already formed during the formation of adjacent corrugations.

5. In corrugating apparatus, corrugating means adapted to present to a web, continuously, a stationary surface having ridges, and means for depressing said web into said ridges, said means arranged to act successively in the direction of travel of said web, means for retaining at least some of the formed corrugations during the formation of additional corrugations, said depressing means arranged to travel continuously with said web, and said retaining means arranged to act on said depressing means.

6. In corrugating apparatus a plurality of longitudinally disposed elements traveling with a web, a second series of longitudinally disposed elements traveling with said web, but arranged on the opposite side thereof, and means for bringing said elements into interdigitating relationship, said means arranged to act successively, and means for continuously holding said elements in interdigitating relationship when in contact with said web.

7. In corrugating apparatus, a circumferentially grooved cylinder adapted to turn with a web of material led thereabout, progressively acting means for depressing portions of said web into said grooves and holding at least some of said portions depressed while additional portions are being depressed into other grooves, and means adapted to travel continuously with said web on said cylinder to maintain corrugations therein.

8. In corrugating apparatus, a circumferentially grooved cylinder of relatively large diameter, a plurality of sheaves arranged about the surface of said cylinder in echelon formation, but out of contact with said surface, and means for passing belts respectively from said sheaves tangentially to the surface of said cylinder and into said grooves, whereby the points of engagement of said belts in said grooves will be disposed in echelon formation.

9. In an apparatus for corrugating paper, the combination of a member presenting longitudinally disposed lands or ridges to a web of paper upon one side, means disposed on the other side of said web comprising a series of belts adapted to move continuously with said web, means for bringing said belts successively into interdigitating relationship with said lands, and means acting on said belts while in contact with said web, and at least at intervals throughout their length to maintain said interdigitating relationship.

10. In corrugating apparatus, the combination of a member adapted to present grooves or lands to a web, said grooves or lands being arcuately shaped in the direction of movement of said web, means for successively depressing portions of said web between said lands, and holding means comprising belts tensioned longitudinally about said arcuate lands to maintain the corrugations so formed.

11. In corrugating apparatus, the combination of means presenting a grooved surface to a web, means for depressing a web between the lands of said grooved surface, whereby to corrugate said web, means for maintaining the corrugations formed therein, a felt, pressure rolls, and means for bringing said felt into contact with said web after it is corrugated so as to bind the corrugations therein and so as to pass said web and said felt together through said pressure rolls to crush said corrugations.

12. In corrugating apparatus, a plurality of elements adapted to present longitudinally to a web a series of lands or ridges, a second series of elements traveling with said web but arranged on the opposite side thereof, means for bringing said last mentioned elements successively into interdigitating relationship with said first mentioned elements, and means for maintaining the said interdigitating relationship of elements at least during the interdigitation of adjacent elements, the means acting on said elements being adjustable to control said relationship at least to a point at which one series of said elements is depressed beyond co-planar relationship with the other.

13. In corrugating apparatus, means presenting to a web a longitudinally ridged corrugating surface, a series of belts arranged for conjoint travel with said web and disposed on the opposite side thereof, means for bringing said belts successively into paths of travel lying substantially between ridges of said first mentioned means, said last mentioned means comprising means for changing the direction of the paths of travel of said belts, and means for bringing said belts successively into positions substantially between said ridges at progressively greater distances from a given point, and means for maintaining the interdigitating relationship so produced at least during the interdigitation of adjacently disposed belts and ridges.

14. In corrugating apparatus, a plurality of elements presenting longitudinally disposed lands or ridges to a web upon one side, a plurality of belts disposed on the other side of said web, means for bringing said belts successively into interdigitating relationship with said first mentioned means, and means for continuously maintaining said interdigitating relationship, said means comprising sheaves acting on said belts at least at intervals throughout the conjoint travel of said belts with said web.

15. In corrugating apparatus, a plurality of elements presenting longitudinally disposed lands or ridges to a web upon one side, a plurality of belts disposed on the other side of said web, means for bringing said belts successively into interdigitating relationship with said first mentioned means, and means for maintaining said interdigitating relationship at least during the interdigitation of adjacent elements, said means comprising sheaves acting on said belts at least at intervals in the conjoint travel of said belts with said web, said sheaves being depressable between said lands or ridges, at least to the extent of depressing said belts below the tops of said lands or ridges.

16. In corrugating apparatus, corrugating means traveling with a web, said means adapted to present to said web, continuously, a surface having ridges, and means for depressing said web into said ridges, said means arranged to act successively in the direction of travel of said web, said depressing means comprising elements continuously moving with said web, and means for holding said depressing means in meshing relationship with said ridges from the point of formation of corrugations at least until the formation of the next succeeding corrugations.

17. In corrugating apparatus, a plurality of corrugating means longitudinally disposed and continuously traveling with the web, and a second series of longitudinally disposed corrugating means upon the opposite side of said web and arranged to travel continuously therewith, and means for successively depressing members of one of said series between members of the other of said series so as to corrugate said web, and means for holding said elements in interdigitating relationship when in contact with said web from the point of formation of corrugations at least until the formation of the next succeeding corrugations.

18. In corrugating apparatus, a plurality of bands arranged to present a longitudinal ridged corrugating surface, said bands arranged for conjoint travel, a second series of bands arranged for conjoint travel, and means for bringing members of said second series of bands successively into paths of travel lying substantially between members of said first series, said means comprising means for changing the direction of paths of travel of bands in said second series, and means for bringing said first series of bands into successive positions to intersect said paths at progressively greater distances from a given point, and means for holding said elements in interdigitating relationship when in contact with said web during the formation of adjacent and succeeding corrugations.

19. In corrugating apparatus, a circumferentially grooved cylinder adapted to turn with a web of material led thereabout, successively acting means for depressing portions of said web into said grooves, said means comprising belt-like members adapted to travel continuously with said web on said cylinder under sufficient tension to maintain the corrugations therein.

WILLIAM WALLACE ROWE.
WARREN A. MORRIS.